United States Patent
Suto et al.

(10) Patent No.: US 11,488,623 B2
(45) Date of Patent: Nov. 1, 2022

(54) EVALUATION METHOD OF MAGNETIC HEAD AND EVALUATION DEVICE OF MAGNETIC HEAD

(71) Applicants: KABUSHIKI KAISHA TOSHIBA, Tokyo (JP); Toshiba Electronic Devices & Storage Corporation, Tokyo (JP)

(72) Inventors: Hirofumi Suto, Ota (JP); Tazumi Nagasawa, Yokohama (JP); Masayuki Takagishi, Kunitachi (JP); Naoyuki Narita, Funabashi (JP); Tomoyuki Maeda, Kawasaki (JP)

(73) Assignees: KABUSHIKI KAISHA TOSHIBA, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/389,951

(22) Filed: Jul. 30, 2021

(65) Prior Publication Data

US 2022/0122632 A1 Apr. 21, 2022

(30) Foreign Application Priority Data

Oct. 20, 2020 (JP) .............................. JP2020-175804

(51) Int. Cl.
*G11B 5/11* (2006.01)
*G11B 5/31* (2006.01)
(Continued)

(52) U.S. Cl.
CPC .............. *G11B 5/455* (2013.01); *G11B 5/315* (2013.01); *G11B 5/02* (2013.01); *G11B 5/11* (2013.01)

(58) Field of Classification Search
CPC ......... G11B 21/083; G11B 5/012; G11B 5/82; G11B 5/54; G11B 5/00; G11B 11/10;
(Continued)

(56) References Cited

U.S. PATENT DOCUMENTS

| 8,896,947 B2 * | 11/2014 | Koizumi .................. G11B 5/40 360/59 |
| 9,666,216 B1 * | 5/2017 | Kobayashi ............... G11B 5/02 |
| 2018/0261241 A1 | 9/2018 | Narita et al. |

FOREIGN PATENT DOCUMENTS

JP 2018-147540 A 9/2018

OTHER PUBLICATIONS

Suto et al., "Magnetization Dynamics of a Flux Control Device Fabricated in the Write Gap of a Hard-Disk-Drive Write Head for High-Density Recording" J. Appl. Phys. 129, 103901 (2021) https://doi.org/10.1063/5.0041561, Dec. 24, 2020, 8 pages.

* cited by examiner

*Primary Examiner* — Nabil Z Hindi
(74) *Attorney, Agent, or Firm* — Oblon, McClelland, Maier & Neustadt, L.L.P.

(57) ABSTRACT

According to one embodiment, an evaluation method of a magnetic head is disclosed. The method can include acquiring an electrical signal obtained from a magnetic element when supplying a first alternating current to a coil of a magnetic head and supplying a second current to the magnetic element. The magnetic head includes a first magnetic pole, a second magnetic pole, and a coil. The magnetic element is provided between the first magnetic pole and the second magnetic pole, and includes a first magnetic layer. The method can include detecting a time required for a change of an electrical resistance of the magnetic element (Continued)

based on a time when a polarity of the first alternating current is reversed based on the electrical signal.

20 Claims, 7 Drawing Sheets

(51) Int. Cl.
*G11B 5/455* (2006.01)
*G11B 5/02* (2006.01)

(58) Field of Classification Search
CPC .......... G11B 2005/3996; G11B 11/105; G11B 2005/0021; G11B 5/09; G11B 27/36; G11B 5/11; G11B 5/3133
USPC ............................................ 360/59, 75, 324
See application file for complete search history.

EVALUATION METHOD OF MAGNETIC HEAD AND EVALUATION DEVICE OF MAGNETIC HEAD

CROSS-REFERENCE TO RELATED APPLICATIONS

This application is based upon and claims the benefit of priority from Japanese Patent Application No. 2020-175804, filed on Oct. 20, 2020; the entire contents of which are incorporated herein by reference.

FIELD

Embodiments described herein relate generally to an evaluation method of a magnetic head and an evaluation device of the magnetic head.

BACKGROUND

Information is recorded on a magnetic recording medium such as an HDD (Hard Disk Drive) using a magnetic head. A method and device for evaluating characteristics of a magnetic head are desired.

DETAILED DESCRIPTION

Figure 1:
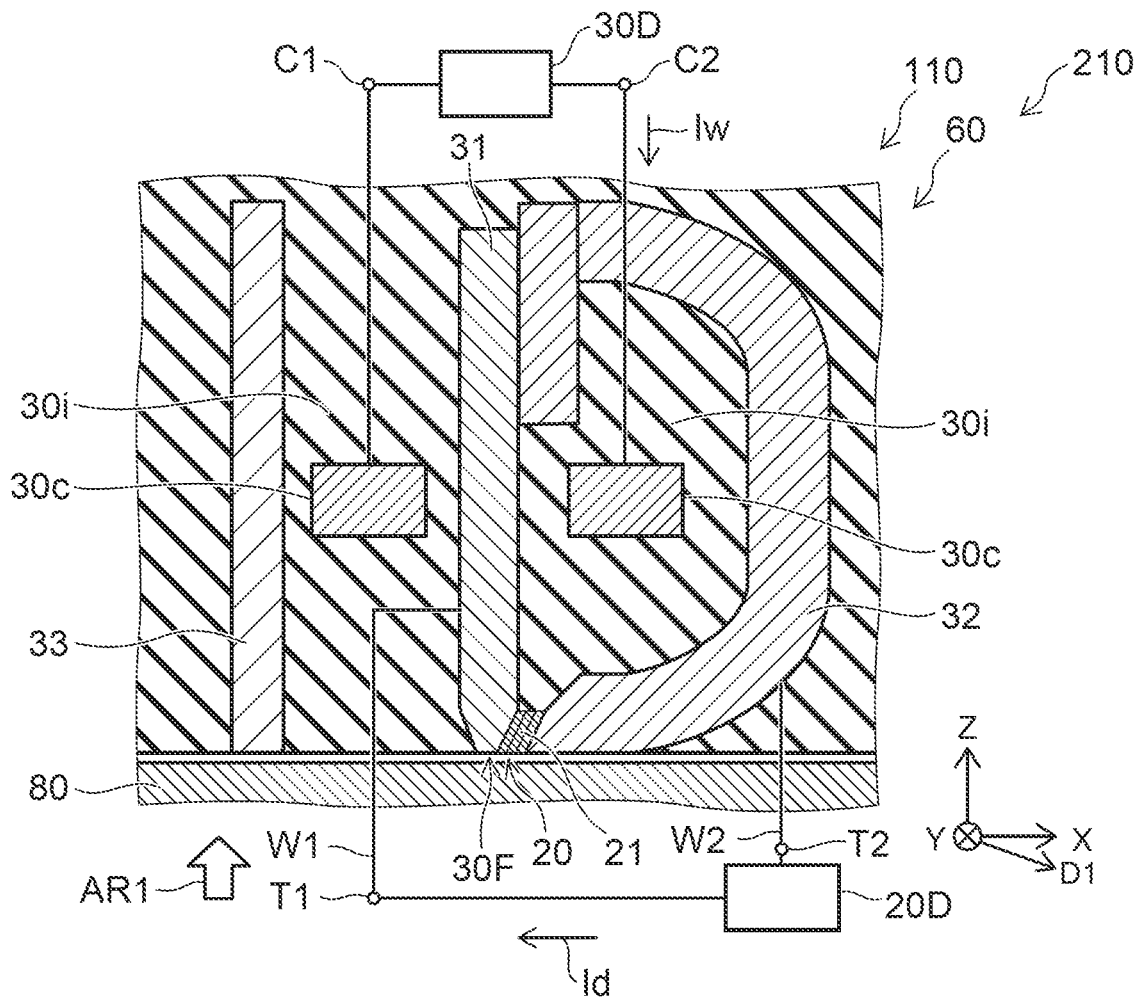
FIG. 1 is a schematic cross-sectional view illustrating a magnetic head evaluated by an evaluation device of the magnetic head according to a first embodiment.

According to one embodiment, an evaluation method of a magnetic head is disclosed. The method can include acquiring an electrical signal obtained from a magnetic element when supplying a first alternating current to a coil of a magnetic head and supplying a second current to the magnetic element. The magnetic head includes a first magnetic pole, a second magnetic pole, and a coil. The magnetic element is provided between the first magnetic pole and the second magnetic pole, and includes a first magnetic layer. The method can include detecting a time required for a change of an electrical resistance of the magnetic element based on a time when a polarity of the first alternating current is reversed based on the electrical signal.

According to one embodiment, an evaluation device of a magnetic head includes a first circuit, a second circuit, and a third circuit. The first circuit is configured to supply a first alternating current to a coil of the magnetic head. The magnetic head includes a first magnetic pole, a second magnetic pole, a magnetic element, and the coil. The magnetic element is provided between the first magnetic pole and the second magnetic pole, and includes a first magnetic layer. The second circuit is configured to supply a second current to the magnetic element when the first alternating current is supplied to the coil. The third circuit is configured to acquire an electrical signal obtained from the magnetic element when the first alternating current is supplied to the coil and the second current is supplied to the magnetic element, and is configured to detect a time required for a change of an electrical resistance of the magnetic element based on a time when a polarity of the first alternating current is reversed based on the electrical signal.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

The first embodiment relates to an evaluation device of a magnetic head.

FIG. 1 is a schematic cross-sectional view illustrating a magnetic head evaluated by an evaluation device of the magnetic head according to a first embodiment.

As shown in FIG. 1, the magnetic head 110 includes a first magnetic pole 31, a second magnetic pole 32, a magnetic element 20, and a coil 30c. In this example, a shield 33 is further provided. The first magnetic pole 31, the second magnetic pole 32, the magnetic element 20, the coil 30c, and the shield 33 are included in a recording part 60. As will be described later, the magnetic head 110 may be provided with a reproducing part. The magnetic head 110 is included in a magnetic recording device 210.

A first magnetic pole 31 is provided between the shield 33 and the second magnetic pole 32. For example, at least a portion of the coil 30c is provided between the first magnetic pole 31 and the second magnetic pole 32. In this example, a portion of the coil 30c is provided between the shield 33 and the first magnetic pole 31.

A recording electric circuit 30D is electrically connected to the coil 30c. A recording current Iw is supplied from the recording electric circuit 30D to the coil 30c. A magnetic field (recording magnetic field) corresponding to the recording current Iw is generated from the first magnetic pole 31. The recording magnetic field is applied to a magnetic recording medium 80, and information is recorded on the magnetic recording medium 80. In this way, the recording electric circuit 30D can supply the current (recording current Iw) corresponding to the recorded information to the coil 30c. For example, the magnetic recording medium 80 is a perpendicular magnetic recording medium.

As shown in FIG. 1, a magnetic element 20 is provided between the first magnetic pole 31 and the second magnetic pole 32. The magnetic element 20 includes a first magnetic layer 21.

As shown in FIG. 1, for example, an insulating portion 30i is provided around the first magnetic pole 31, and the second magnetic pole 32, the shield 33, the coil 30c, and the magnetic element 20.

The first magnetic pole 31 is, for example, a main magnetic pole. A magnetic pole surface 30F is provided at the end of the first magnetic pole 31. The magnetic pole surface 30F is, for example, along the ABS (Air Bearing Surface) of the magnetic head 110. The magnetic pole surface 30F faces the magnetic recording medium 80.

A direction perpendicular to the magnetic pole surface 30F is taken as the Z-axis direction. One direction perpendicular to the Z-axis direction is taken as the X-axis direction. A direction perpendicular to the Z-axis direction and the X-axis direction is taken as the Y-axis direction.

The Z-axis direction is, for example, the height direction. The X-axis direction is, for example, the down-track direction. The Y-axis direction is the cross-track direction.

For example, in the vicinity of the magnetic pole surface 30F, the second magnetic pole 32 separates from the first magnetic pole 31 along the X-axis direction. The magnetic head 110 and the magnetic recording medium 80 move relative to each other substantially along the X-axis direction. As a result, information is recorded at an arbitrary position on the magnetic recording medium 80.

The second magnetic pole 32 corresponds to, for example, a "trailing shield". The shield 33 corresponds to, for example, a "leading shield". The second magnetic pole 32 is, for example, an auxiliary magnetic pole. The second magnetic pole 32 can form a magnetic core together with the first magnetic pole 31. For example, additional shields such as side shields (not shown) may be provided.

As shown in FIG. 1, an element current Id flows through the magnetic element 20. In the example shown in FIG. 1, the element current Id has an orientation from the first magnetic pole 31 to the second magnetic pole 32.

For example, the magnetic element 20 may be electrically connected to the first magnetic pole 31 and the second magnetic pole 32. In this case, the element current Id may be supplied to the magnetic element 20 via the first magnetic pole 31 and the second magnetic pole 32.

As shown in FIG. 1, a first wiring W1 and a second wiring W2 may be provided. The first wiring W1 is electrically connected to the first magnetic pole 31. The second wiring W2 is electrically connected to the second magnetic pole 32. A first terminal T1 and a second terminal T2 may be provided. The first terminal T1 is electrically connected to the first magnetic pole 31 via the first wiring W1. The second terminal T2 is electrically connected to the second magnetic pole 32 via the second wiring W2.

The element current Id is supplied from, for example, an element electric circuit 20D. For example, the element current Id can be supplied to the first magnetic pole 31 and the second magnetic pole 32 from the element electric circuit 20D via the first terminal T1, the first wiring W1, the second wiring W2, and the second terminal T2.

In the embodiment, the element current Id flows through the magnetic element 20, so that the magnetic field emitted from the first magnetic pole 31 can be efficiently directed to the magnetic recording medium 80. It is considered that this is because the orientation of the magnetization of the first magnetic layer 21 is reversed with respect to the magnetic field emitted from the first magnetic pole 31 due to the element current Id, and as a result, the magnetic field emitted from the first magnetic pole 31 becomes difficult to pass through the first magnetic layer 21, and becomes easy to move toward the magnetic recording medium 80. By such an operation, the recording density can be improved.

As will be described later, the magnetic element 20 may include a second magnetic layer. In this case, the element current Id is supplied to the magnetic element 20, so that, for example, the magnetic element 20 oscillates. The magnetic element 20 functions as an STO (Spin Torque Oscillator). An alternating magnetic field (for example, a high frequency magnetic field) is generated from the magnetic element 20 with the oscillation. The alternating magnetic field generated by the magnetic element 20 is applied to the magnetic recording medium 80, and recording on the magnetic recording medium is assisted. For example, MAMR (Microwave Assisted Magnetic Recording) can be performed. In this case as well, the recording density can be improved.

In such a magnetic head 110, it is desired to evaluate the rising characteristic of the operation of the magnetic element 20. For example, more effective recording can be performed by reversing the magnetization of the magnetic layer at high speed. For example, more effective recording can be performed by being able to shift to the oscillation state at high speed. As a result, the recording density can be improved more effectively.

For example, in the magnetic element 20, when the magnetization of the first magnetic layer 21 is reversed, the electrical resistance of the magnetic element 20 becomes higher than the electrical resistance of the magnetic element 20 before the magnetization is reversed. For example, when the magnetic element 20 oscillates, the electrical resistance of the magnetic element 20 becomes a value different from the electrical resistance before the magnetic element 20 oscillates. The time required for such a change in electrical resistance corresponds to the rise time of the operation (reversal of magnetization or oscillation) of the magnetic element 20.

The embodiment provides an evaluation device for the magnetic head 110. In the embodiment, for example, it is possible to evaluate the rise time of the operation of the magnetic element 20 based on the polarity reversal of the current supplied to the coil 30c. The rise time of operation corresponds to the time of change in the electrical resistance of the magnetic element 20.

Figure 2:
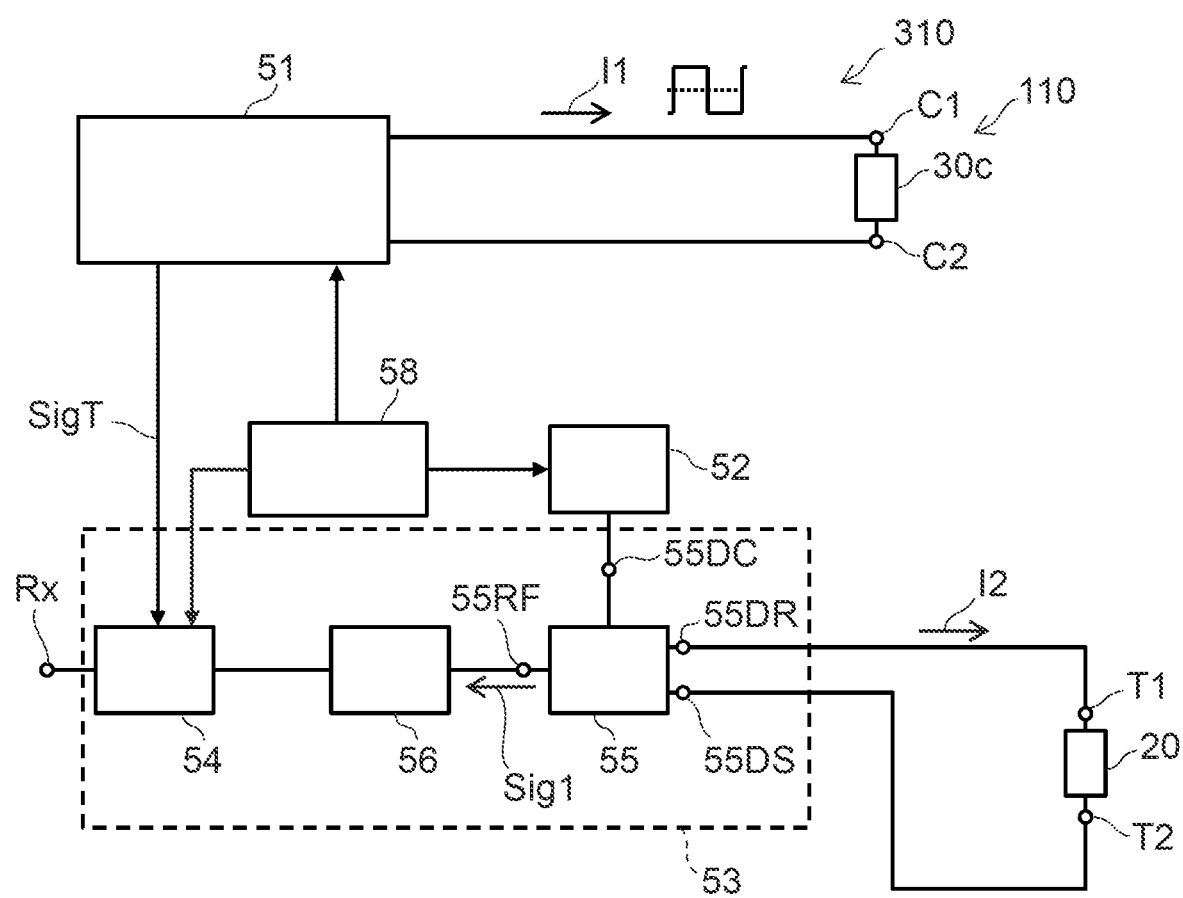
FIG. 2 is a schematic view illustrating the evaluation device of the magnetic head according to the first embodiment.

FIG. 2 is a schematic view illustrating the evaluation device of the magnetic head according to the first embodiment.

As shown in FIG. 2, an evaluation device 310 according to the embodiment includes a first circuit 51, a second circuit 52, and a third circuit 53. The first circuit 51 can supply a first alternating current I1 to the coil 30c of the magnetic head 110. As described above, the magnetic head 110 includes the first magnetic pole 31, the second magnetic pole 32, the magnetic element 20, and the coil 30c. As described above, the magnetic element 20 is provided between the first magnetic pole 31 and the second magnetic pole 32. The magnetic element 20 includes the first magnetic layer 21.

The second circuit 52 can supply a second current I2 to the magnetic element 20 when the first alternating current I1 is supplied to the coil 30c. The second circuit 52 is electrically connected to the magnetic element 20. For example, the second circuit 52 is electrically connected to the magnetic element 20 via the first terminal T1 and the second terminal T2. In this example, the second circuit 52 is electrically connected to the magnetic element 20 via a DC+AC superimposition circuit 55 included in the third circuit 53, which will be described later. The second circuit 52 may be able to detect the temporal average value of the electrical resistance of the magnetic element 20.

The third circuit 53 can acquire an electrical signal Sig 1 obtained from the resistance change of the magnetic element 20 when the first alternating current I1 is supplied to the coil 30c and the second current I2 is supplied to the magnetic element 20. The third circuit 53 can detect the time of change in the electrical resistance of the magnetic element 20 based on the time when the polarity of the first alternating current I1 is reversed based on the electrical signal Sig 1. The electrical signal Sig 1 obtained from the magnetic element 20 when the first alternating current I1 is supplied to the coil 30c and the second current I2 is supplied to the magnetic element 20 responds to a change in the electrical resistance of the magnetic element 20. The change in electrical resistance corresponds to the reversal of magnetization in the magnetic element 20 or the transition to the oscillation state in the magnetic element 20.

According to the embodiment, for example, it is possible to detect a delay in the change in the electrical resistance of the magnetic element 20 based on the time when the polarity of the first alternating current I1 reverses. For example, the transition time required for magnetization reversal can be detected. For example, the transition time required for transition to the oscillation state can be detected. According to the embodiment, it is possible to provide an evaluation device capable of evaluating the characteristics of the magnetic head.

In this example, the third circuit 53 includes an addition averaging part 54. The addition averaging part 54 adds and averages the electrical signal Sig 1 in synchronization with the first alternating current I1. For example, a trigger signal Sig T is supplied from the first circuit 51 to the addition averaging part 54. The trigger signal Sig T is, for example, a signal corresponding to the time of polarity reversal of the first alternating current I1. When the trigger signal Sig T is supplied to the addition averaging part 54, the addition averaging part 54 adds and averages the electrical signal Sig 1 in synchronization with the first alternating current I1. The addition averaging part 54 may be, for example, an oscilloscope. The addition averaging part 54 may be, for example, a digital integrator.

In this example, the third circuit 53 includes the DC+AC superimposing circuit 55. The DC+AC superimposition circuit 55 includes a DC+AC port 55DR, a DC+AC port 55DS, a DC port 55DC, and an AC port 55RF. The DC+AC port 55DR is electrically connected to one end of the magnetic element 20 (for example, the first terminal T1). The DC+AC port 55DS is electrically connected to the other end of the magnetic element 20 (for example, the second terminal T2). The DC port 55DC is electrically connected to the second circuit 52. The AC port 55RF can output the high frequency component of the electrical signal Sig 1 to the addition averaging part 54.

In this example, the third circuit 53 includes an amplifier 56. The amplifier 56 acquires the high frequency component of the electrical signal Sig 1 from the AC port 55RF. The amplifier can output a signal obtained by amplifying the high frequency component to the addition averaging part 54. The amplifier 56 is, for example, a high frequency amplifier.

As shown in FIG. 2, a controller 58 may be provided. The controller 58 can control the operation of the first circuit 53, the second circuit 52, and the third circuit 53.

Hereinafter, an example of the first alternating current I1 and the electrical signal Sig 1 will be described.

Figure 3A:
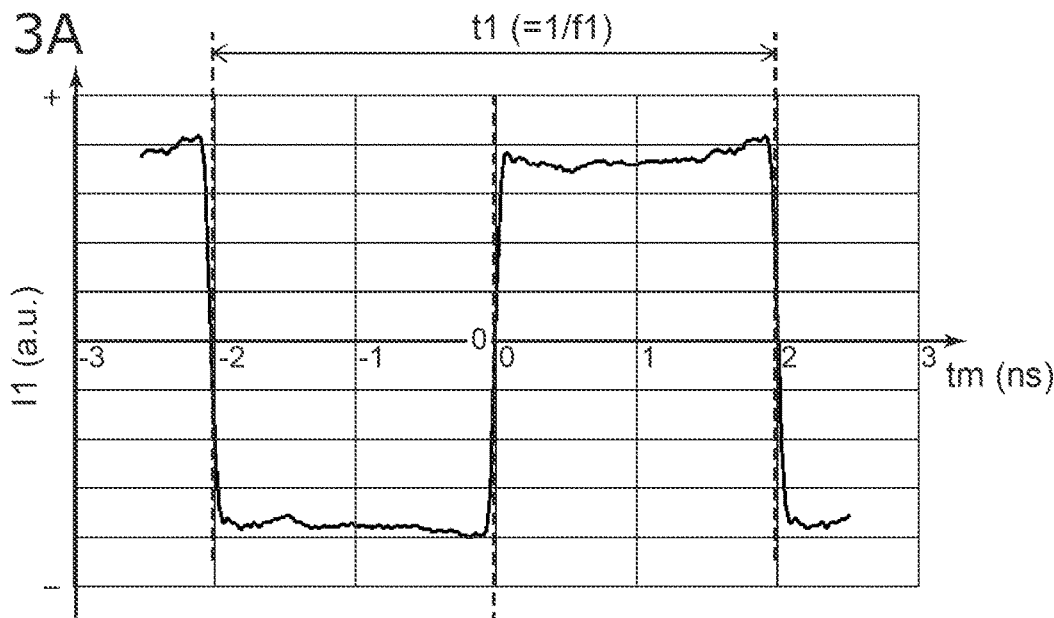
FIGS. 3A and 3B are graph views illustrating characteristics of the evaluation device of the magnetic head according to the first embodiment.
Figure 3B:
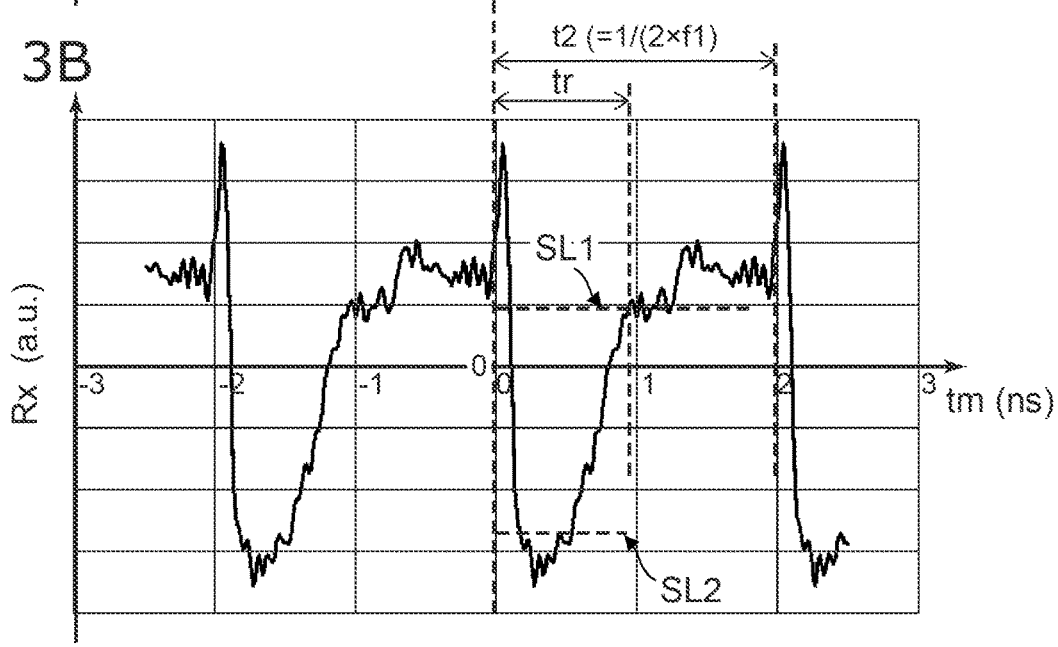

FIGS. 3A and 3B are graphs illustrating the characteristics of the magnetic head evaluation device according to the first embodiment.

The horizontal axis of these figures is time tm. The unit of time tm may be "ns" or the like. The vertical axis of FIG. 3A is the first alternating current I1. The vertical axis of FIG. 3B is an integrated signal Rx obtained by adding and averaging the electrical signal Sig 1 obtained from the magnetic element 20. The added and averaged signal Rx is the output of the third circuit 53. The change in the added and averaged signal Rx depends on the change in the electrical resistance of the magnetic element 20. In this example, the operation of reversing the magnetization of the first magnetic layer 21 is performed.

As shown in FIG. 3A, the first alternating current I1 has a first frequency f1. The first period t1 of the first alternating current I1 is 1/f1.

As shown in FIG. 3B, the added and averaged signal Rx has a second frequency that is twice the first frequency f1. The second period t2 of the added and averaged signal Rx is $1/(2\times f1)$. The added and averaged signal Rx is twice the first frequency f1, and at this time, the electrical signal Sig 1 before being added and averaged also has the second frequency twice the first frequency f1. For example, when the polarity of the first alternating current I1 is reversed from negative to positive, the reversal of the magnetization of the magnetic element 20 occurs, and when the polarity of the first alternating current I1 is reversed from positive to negative, the reversal of the magnetization of the magnetic element 20 occurs. Therefore, the frequency of change of the electrical signal Sig 1 obtained from the magnetic element 20 is twice the frequency of the first alternating current I1.

In this example, as shown in FIG. 3B, the added and averaged signal Rx undergoes a short peak (corresponding to noise), and a low value, and changes to a high value after the polarity reversal of the first alternating current I1. The state of the low value of the added and averaged signal Rx corresponds to the state before the magnetization of the first magnetic layer 21 is reversed. The state of the high value of the added and averaged signal Rx corresponds to the state after the magnetization of the first magnetic layer 21 is reversed. For example, for the added and averaged signal Rx, a first value SL1 corresponding to a high value and a second value SL2 corresponding to a low value may be set. For example, the time until the added and averaged signal Rx rises from the second value SL2 to the first value SL1 and the added and averaged signal Rx reaches the first value SL1 is set to be the rise time tr based on the time of reversal of the first alternating current I1. In the embodiment, the rise time tr can be detected.

As described above, in the embodiment, the third circuit 53 can detect the rise time tr based on the electrical signal Sig 1. The rise time tr corresponds to the time required for the change in the electrical resistance of the magnetic element 20 with reference to the time when the polarity of the first alternating current I1 is reversed.

For example, when the configuration of the magnetic element 20 in the magnetic head 110 changes, the rise time tr changes. For example, when the magnitude or timing of the second current I2 supplied to the magnetic element 20 is changed, the rise time tr changes. By evaluating the characteristics of the magnetic head 110 by the evaluation device 310 according to the embodiment, appropriate conditions in the magnetic head 110 can be efficiently set.

In the embodiment, for example, the addition averaging part 54 of the third circuit 53 may be possible to extract the above-mentioned second frequency component of the added and averaged electrical signal Sig 1 (that is, the added and averaged signal Rx) by addition averaging the electrical signal Sig 1 in synchronization with the first alternating current I1. By extracting the component of the second frequency that is twice the first frequency f1 of the first alternating current I1, the rise time tr can be efficiently derived from the added and averaged signal Rx.

In the embodiment, the first frequency f1 is preferably not less than 100 MHz and not more than 5 GHz. The first frequency f1 may be lower than the frequency corresponding to "1T" in the operating conditions of the magnetic head 110. The characteristics of the magnetic head 110 can be evaluated even if the first frequency f1 different from the frequency corresponding to "1T" is used. When the first frequency f1 is not less than 100 MHz and not more than 5 GHz, for example, it becomes easy to estimate the rise time of nanoseconds or sub-nanoseconds, which is important in the recording operation.

Second Embodiment

The second embodiment relates to an evaluation method of the magnetic head.

Figure 4:
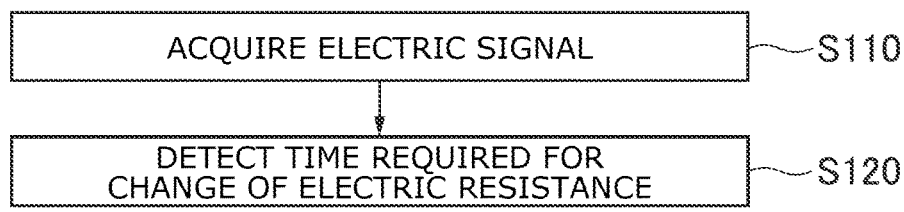
FIG. 4 is a flow chart illustrating an evaluation method of the magnetic head according to a second embodiment.

FIG. 4 is a flow chart illustrating the evaluation method of the magnetic head according to the second embodiment.

As shown in FIG. 4, in the method for evaluating the magnetic head according to the embodiment, the electrical signal Sig 1 obtained from the magnetic element 20 is acquired (step S110). As described above, the magnetic head 110 includes the first magnetic pole 31, the second magnetic pole 32, the magnetic element 20, and the coil 30c (see FIG. 1). In step S110, the electrical signal Sig 1 is acquired (see FIG. 2), which is obtained from the magnetic element 20 when the first alternating current I1 is supplied to the coil 20c and the second current I2 is supplied to the magnetic element 20. As described above, the magnetic element 20 is provided between the first magnetic pole 31 and the second magnetic pole 32. The magnetic element 20 includes the first magnetic layer 21.

As shown in FIG. 4, in the evaluation method, the time (rise time tr: See FIG. 3A) is detected (step S120), which is required for the change in the electrical resistance of the magnetic element 20 based on the time when the polarity of the first alternating current I1 is reversed based on the electrical signal Sig 1. According to the embodiment, it is possible to evaluate the operating characteristics of the magnetic head 110.

As described above, the first alternating current I1 has a first frequency f1. The electrical signal Sig 1 (or the added and averaged signal Rx) has a second frequency that is twice the first frequency f1. For example, the detection of the time required for the above change (step S120) may include adding and averaging the electrical signal Sig 1 in synchronization with the first alternating current I1. Step S120 may include extracting the above-mentioned second frequency component of the added and averaged electrical signal Sig 1 (that is, the added and averaged signal Rx). The first frequency f1 is, for example, not less than 1 MHz and not more than 5 GHz. For example, the detection of the time required for the above change (step S120) may include adding and averaging the electrical signal Sig 1 in synchronization with the first alternating current I1.

Hereinafter, an example of the magnetic head evaluation device 310 or the magnetic head 110 evaluated by the evaluation method according to the embodiment will be described.

Figure 5A:
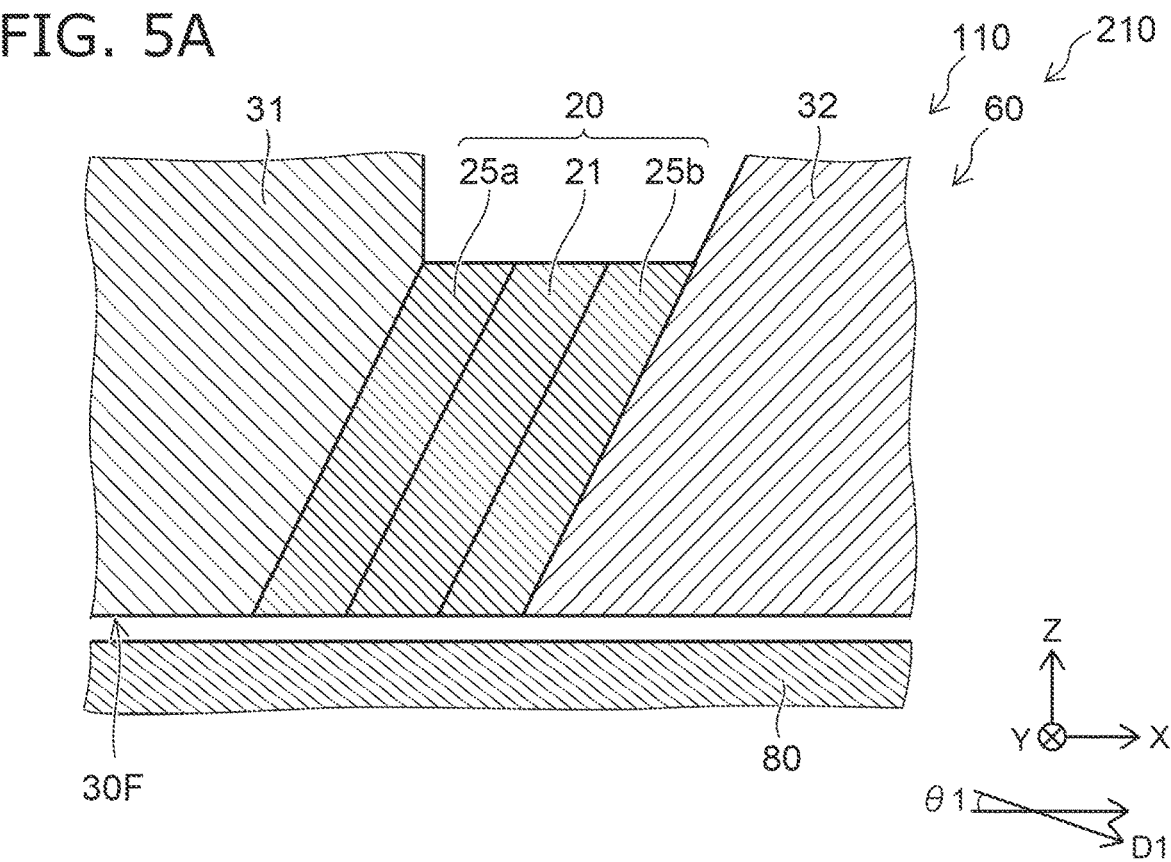
FIGS. 5A and 5B are schematic cross-sectional views illustrating magnetic heads evaluated by the evaluation device or the evaluation method of the magnetic head.
Figure 5B:
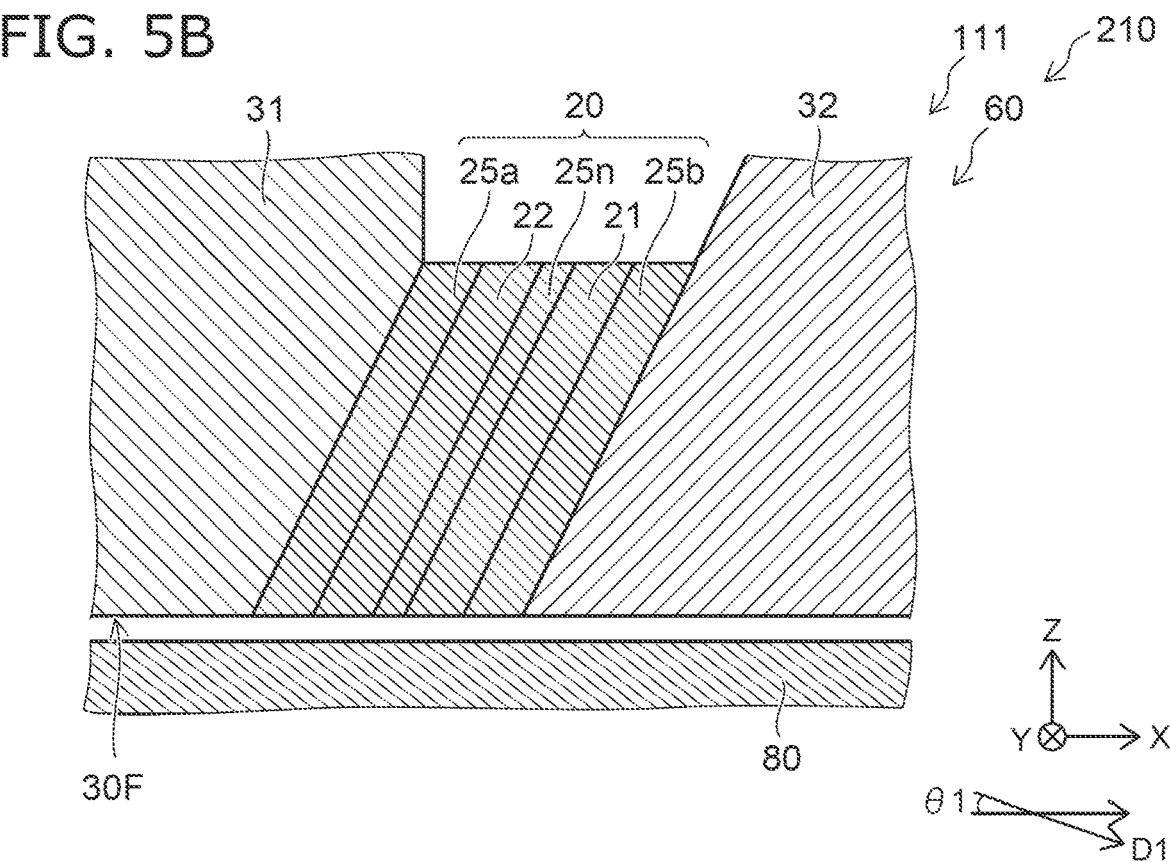

FIGS. 5A and 5B are schematic cross-sectional views illustrating magnetic heads evaluated by the evaluation device or the evaluation method of the magnetic head.

As shown in FIG. 5A, in the magnetic head 110, the magnetic element 20 may include a first magnetic pole side non-magnetic layer 25a and a second magnetic pole side non-magnetic layer 25b in addition to the first magnetic layer 21. The first magnetic pole side non-magnetic layer 25a is provided between the first magnetic pole 31 and the first magnetic layer 21. The second magnetic pole side non-magnetic layer 25b is provided between the first magnetic layer 21 and the second magnetic pole 32.

In one example, the first magnetic pole side non-magnetic layer 25a includes a first material, and the second magnetic pole side non-magnetic layer 25b includes a second material. The first material includes, for example, at least one selected from the group consisting of Ta, Pt, W, Ir, Mo, Cr, Tb, Mn, and Ni. The second material include, for example, at least one selected from the group consisting of Cu, Ag, Au, Cr, and Ru. In this case, the second current I2 has a first orientation from the first magnetic pole 31 to the second magnetic pole 32. Appropriate magnetization reversal is obtained.

In another example, the first magnetic pole side non-magnetic layer 25a may include the above-mentioned second material, and the second magnetic pole side non-magnetic layer 25b may include the above-mentioned first material. In this case, the second current I2 has a second orientation from the second magnetic pole 32 to the first magnetic pole 31. Appropriate magnetization reversal is obtained.

As shown in FIG. 5B, in the magnetic head 111, the magnetic element 20 further includes a second magnetic layer 22 and a first non-magnetic layer 25n in addition to the first magnetic layer 21. The second magnetic layer 22 is provided between the first magnetic layer 21 and the first magnetic pole 31. The first non-magnetic layer 25n is provided between the first magnetic layer 21 and the second magnetic layer 22. In this case, the magnetic element 20 functions as, for example, an STO element.

As shown in FIG. 5B, in the magnetic head 111, the magnetic element 20 may further include the first magnetic pole side non-magnetic layer 25a and the second magnetic pole side non-magnetic layer 25b. The first magnetic pole side non-magnetic layer 25a is provided between the first magnetic pole 31 and the second magnetic layer 22. The second magnetic pole side non-magnetic layer 25b is provided between the first magnetic layer 21 and the second magnetic pole 32.

In the magnetic head 111, in one example, the first magnetic pole side non-magnetic layer 25a and the second magnetic pole side non-magnetic layer 25b include the first material, and the first non-magnetic layer 25n includes the second material. The first material includes, for example, at least one selected from the group consisting of Ta, Pt, W, Ir, Mo, Cr, Tb, Mn, and Ni. The second material includes, for example, at least one selected from the group consisting of Cu, Ag, Au, Cr, and Ru. In this case, the orientation of the second current I2 may be either the first orientation from the first magnetic pole 31 to the second magnetic pole 32 or the second orientation from the second magnetic pole 32 to the first magnetic pole 31. Appropriate magnetization oscillation can be obtained.

In another example of the magnetic head 111, the first magnetic pole side non-magnetic layer 25a includes the above-mentioned second material, and the second magnetic pole side non-magnetic layer 25b includes the above-mentioned first material. In this case, the second current I2 has the second orientation from the second magnetic pole 32 to the first magnetic pole 31.

As shown in FIGS. 5A and 5B, the direction D1 from the first magnetic pole 31 to the second magnetic pole 32 may be oblique to the X-axis direction. The direction D1 corresponds to the stacking direction of the magnetic elements 20. The X-axis direction is along the magnetic pole surface 30F of the first magnetic pole 31. The angle between the direction D1 and the magnetic pole surface 30F is taken as the angle θ1. The angle θ1 is, for example, not less than 15 degrees and not more than 30 degrees. The angle θ1 may be 0 degrees.

The evaluation device 310 according to the embodiment or the magnetic head (magnetic head 110 or magnetic head 111) evaluated by the evaluation method may be included in the magnetic recording device 210. The magnetic recording device includes the above-mentioned magnetic head, the magnetic recording medium 80 (for example, a recording medium disk 180 described later), the element electric circuit 20D (see FIG. 1), and the electric circuit 30D.

Figure 6:
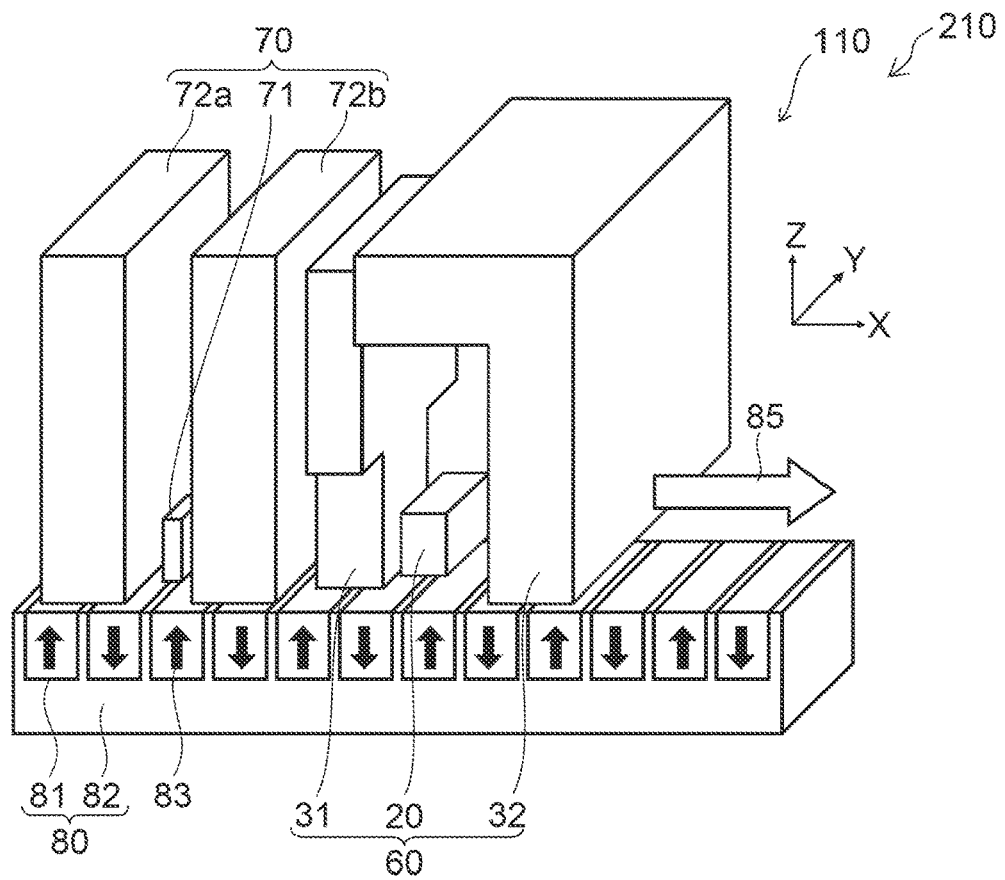
FIG. 6 is a schematic perspective view illustrating a magnetic recording device according to the embodiment.

FIG. 6 is a schematic perspective view illustrating the magnetic head according to the embodiment.

As shown in FIG. 6, the magnetic head according to the embodiment (for example, the magnetic head 110) is used together with the magnetic recording medium 80. In this example, the magnetic head 110 includes the recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 provided on the medium substrate 82. A magnetization 83 of the magnetic recording layer 81 is controlled by the recording part 60.

The reproducing part 70 includes, for example, a first reproducing magnetic shield 72a, a second reproducing magnetic shield 72b, and a magnetic reproducing element 71. The magnetic reproducing element 71 is located between the first reproducing magnetic shield 72a and the second reproducing magnetic shield 72b. The magnetic reproducing element 71 is configured to output a signal corresponding to the magnetization 83 of the magnetic recording layer 81.

As shown in FIG. 6, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

Hereinafter, an example of the magnetic recording device according to the embodiment will be described.

Figure 7:
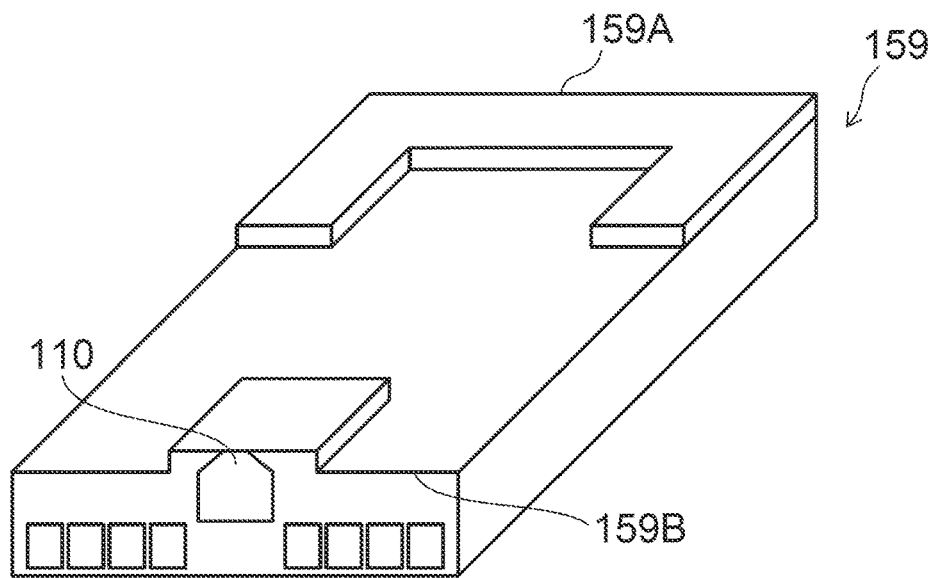
FIG. 7 is a schematic perspective view illustrating a portion of the magnetic recording device according to the embodiment.

FIG. 7 is a schematic perspective view illustrating a portion of the magnetic recording device according to the embodiment.

FIG. 7 illustrates a head slider.

The magnetic head 110 is provided in the head slider 159. The head slider 159 includes, for example, Al$_2$O$_3$/TiC, etc. The head slider 159 moves relative to the magnetic recording medium while flying over or contacting the magnetic recording medium.

The head slider 159 includes, for example, an air inflow side 159A and an air outflow side 159B. The magnetic head 110 is located at the side surface of the air outflow side 159B of the head slider 159 or the like. Thereby, the magnetic head 110 moves relative to the magnetic recording medium while flying over or contacting the magnetic recording medium.

Figure 8:
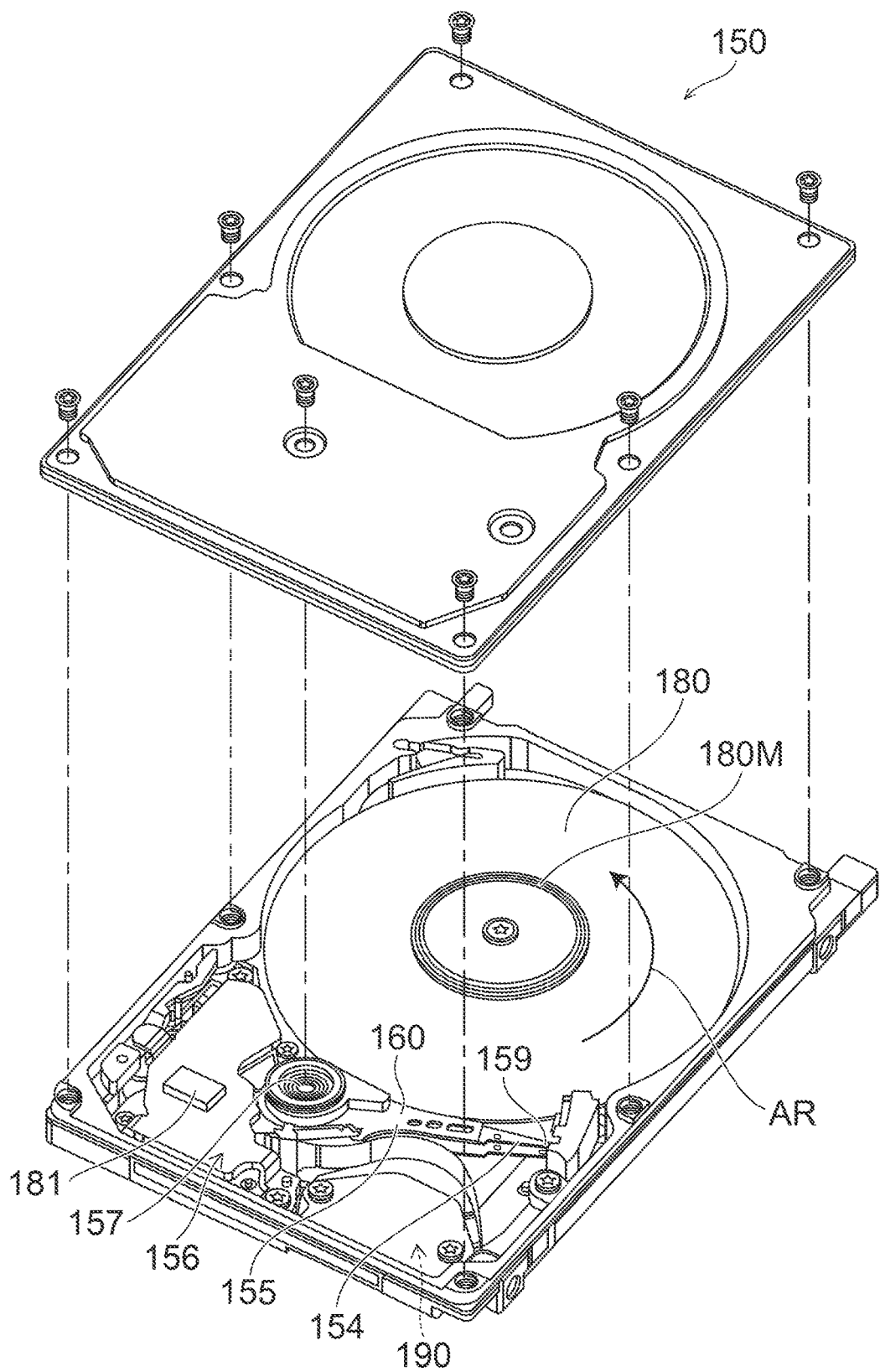
FIG. 8 is a schematic perspective view illustrating the magnetic recording device according to the embodiment.

FIG. 8 is a schematic perspective view illustrating a magnetic recording device according to the embodiment.

As shown in FIG. 8, a rotary actuator is used in the magnetic recording device 150 according to the embodiment. A recording medium disk 180 is provided on a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, an SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. According to the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is located between the permanent magnet and the opposing yoke. The suspension 154 includes one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

Figure 9A:
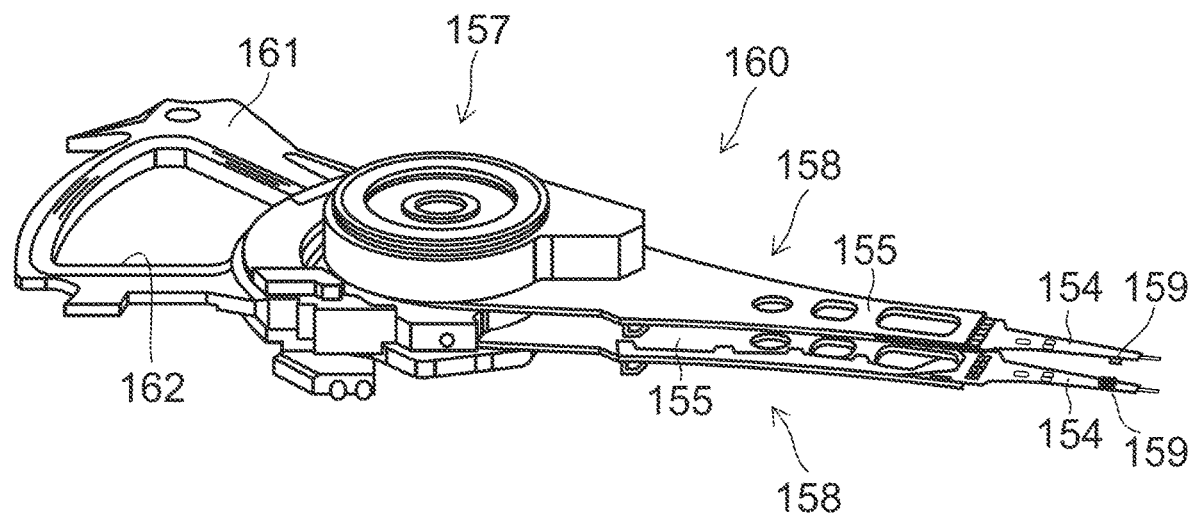
FIGS. 9A and 9B are schematic perspective views illustrating a portion of the magnetic recording device according to the embodiment.
Figure 9B:
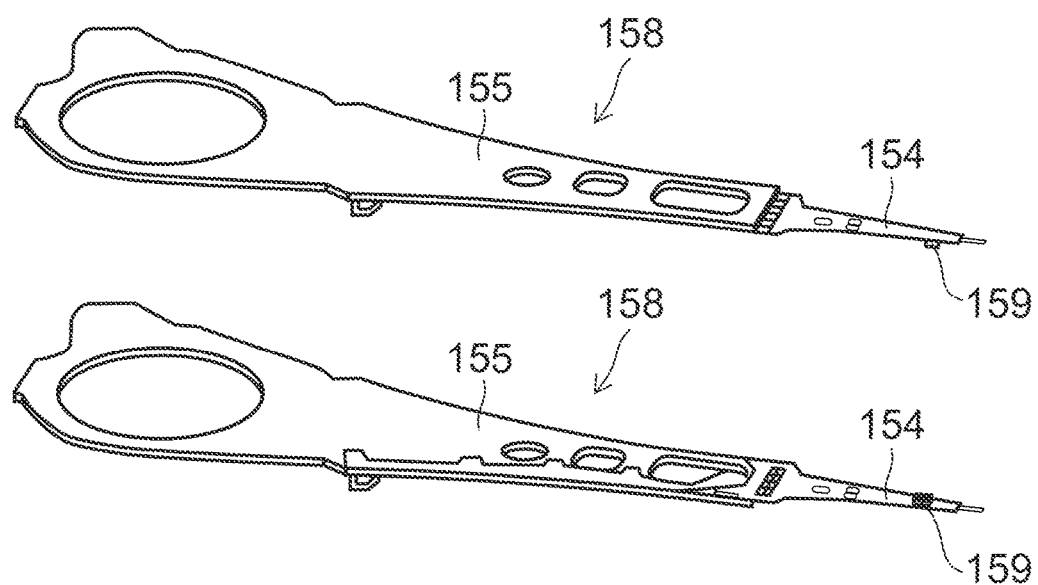

FIGS. 9A and 9B are schematic perspective views illustrating a portion of the magnetic recording device according to the embodiment.

FIG. 9A illustrates the configuration of a portion of the magnetic recording device and is an enlarged perspective view of a head stack assembly 160. FIG. 9B is a perspective view illustrating a magnetic head assembly (a head gimbal assembly (HGA)) 158 that is a portion of the head stack assembly 160.

As shown in FIG. 9A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 9B, the head gimbal assembly 158 includes the arm 155 extending from the bearing part 157, and the suspension 154 extending from the arm 155.

The head slider 159 is provided at the tip of the suspension 154. The magnetic head according to the embodiment is provided in the head slider 159.

The magnetic head assembly (the head gimbal assembly) 158 according to the embodiment includes the magnetic head according to the embodiment, the head slider 159 in which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wire (not illustrated) for a spin torque oscillation element, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

Embodiments may include the following configurations (e.g., technological proposals).

Configuration 1

An evaluation method of a magnetic head, the method comprising:
acquiring an electrical signal obtained from a magnetic element when supplying a first alternating current to a coil of a magnetic head and supplying a second current to the magnetic element, the magnetic head including a first magnetic pole, a second magnetic pole, and a coil, the magnetic element being provided between the first magnetic pole and the second magnetic pole, an including a first magnetic layer; and detecting a time required for a change of an electrical resistance of the magnetic element based on a time when a polarity of the first alternating current is reversed based on the electrical signal.

Configuration 2

The evaluation method according to Configuration 1, wherein
the first alternating current has a first frequency, and
the electrical signal has a second frequency that is twice the first frequency.

Configuration 3

The evaluation method according to Configuration 2, wherein
the detecting the time required for the change includes
adding and averaging the electrical signal in synchronization with the first alternating current, and
extracting a component of the second frequency of the added and averaged electrical signal.

Configuration 4

The evaluation method according to Configuration 2 or 3, wherein
the first frequency is not less than 1 MHz and not more than 5 GHz.

Configuration 5

The evaluation method according to Configuration 1, wherein
the detecting the time required for the change includes adding and averaging the electrical signal in synchronization with the first alternating current.

Configuration 6

The evaluation method according to any one of Configurations 1 to 5, wherein
the magnetic element further includes
a first magnetic pole side non-magnetic layer provided between the first magnetic pole and the first magnetic layer, and
a second magnetic pole side non-magnetic layer provided between the first magnetic layer and the second magnetic pole.

Configuration 7

The evaluation method according to Configuration 6, wherein
in a case where the first magnetic pole side non-magnetic layer includes a first material and the second magnetic pole side non-magnetic layer includes a second material, the second current has a first orientation from the first magnetic pole to the second magnetic pole, the first material includes at least one selected from the group consisting of Ta, Pt, W, Ir, Mo, Cr, Tb, Mn, and Ni, the second material includes at least one selected from the group consisting of Cu, Ag, au, Cr, and Ru, and
in a case where the first magnetic pole side non-magnetic layer includes the second material and the second magnetic pole side non-magnetic layer includes the first material, the second current has a second orientation from the second magnetic pole to the first magnetic pole.

Configuration 8

The evaluation method according to any one of Configurations 1 to 5, wherein
the magnetic element further includes
a second magnetic layer provided between the first magnetic layer and the first magnetic pole, and
a first non-magnetic layer provided between the first magnetic layer and the second magnetic layer.

Configuration 9

The evaluation method according to Configuration 8, wherein
the magnetic element further includes
a first magnetic pole side non-magnetic layer provided between the first magnetic pole and the second magnetic layer, and a second magnetic pole side non-magnetic layer provided between the first magnetic layer and the second magnetic pole.

Configuration 10

The evaluation method according to Configuration 9, wherein the first magnetic pole side non-magnetic layer and the second magnetic pole side non-magnetic layer include a first material, the first non-magnetic layer includes a second material, the first material includes at least one selected from the group consisting of Ta, Pt, W, Ir, Mo, Cr, Tb, Mn, and Ni, and the second material includes at least one selected from the group consisting of Cu, Ag, Au, Cr, and Ru.

Configuration 11

An evaluation device of a magnetic head, the evaluation device comprising:

a first circuit configured to supply a first alternating current to a coil of the magnetic head, the magnetic head including a first magnetic pole, a second magnetic pole, a magnetic element, and the coil, the magnetic element being provided between the first magnetic pole and the second magnetic pole, and including a first magnetic layer;

a second circuit configured to supply a second current to the magnetic element when the first alternating current is supplied to the coil; and a third circuit configured to acquire an electrical signal obtained from the magnetic element when the first alternating current is supplied to the coil and the second current is supplied to the magnetic element, and configured to detect a time required for a change of an electrical resistance of the magnetic element based on a time when a polarity of the first alternating current is reversed based on the electrical signal.

Configuration 12

The evaluation device of the magnetic head according to Configuration 11, wherein the first alternating current has a first frequency, and the electrical signal has a second frequency that is twice the first frequency.

Configuration 13

The evaluation device of the magnetic head according to Configuration 12, wherein the third circuit includes an addition averaging part, and the addition averaging part is configured to add and average the electrical signal in synchronization with the first alternating current and to extract a component of the second frequency of the added and averaged electrical signal.

Configuration 14

The evaluation device of the magnetic head according to Configuration 12 or 13, wherein the first frequency is not less than 1 MHz and not more than 5 GHz.

Configuration 15

The evaluation device of the magnetic head according to any one of Configurations 11 to 14, wherein the third circuit includes an addition averaging part, and the addition averaging part adds and averages the electrical signal in synchronization with the first alternating current.

Configuration 16

The evaluation device of the magnetic head according to Configuration 15, wherein the third circuit includes a DC+AC superimposition circuit, the DC+AC superimposition circuit includes a DC+AC port electrically connected to the magnetic element, a DC port electrically connected to the second circuit, and an AC port configured to output a high frequency component of the electrical signal to the addition averaging part.

Configuration 17

The evaluation device of the magnetic head according to Configuration 16, wherein the third circuit includes an amplifier the amplifier is configured to acquire the high frequency component from the AC port, and is configured to output an amplified signal of the high frequency component to the addition averaging part.

Configuration 18

The evaluation device of the magnetic head according to any one of Configurations 11 to 17, wherein the magnetic element further includes a first magnetic pole side non-magnetic layer provided between the first magnetic pole and the first magnetic layer, and a second magnetic pole side non-magnetic layer provided between the first magnetic layer and the second magnetic pole.

Configuration 19

The evaluation device of the magnetic head according to Configuration 18, wherein in a case where the first magnetic pole side non-magnetic layer includes a first material and the second magnetic pole side non-magnetic layer includes a second material, the second current has a first orientation from the first magnetic pole to the second magnetic pole, the first material includes at least one selected from the group consisting of Ta, Pt, W, Ir, Mo, Cr, Tb, Mn, and Ni, the second material includes at least one selected from the group consisting of Cu, Ag, au, Cr, and Ru, and in a case where the first magnetic pole side non-magnetic layer includes the second material and the second magnetic pole side non-magnetic layer includes the first material, the second current has a second orientation from the second magnetic pole to the first magnetic pole.

Configuration 20

The evaluation device of the magnetic head according to any one of Configurations 11 to 17, wherein the magnetic element includes a second magnetic layer provided between the first magnetic layer and the first magnetic pole, and a first non-magnetic layer provided between the first magnetic layer and the second magnetic layer.

Configuration 21

The evaluation device of the magnetic head according to Configuration 20, wherein the magnetic element further includes a first magnetic pole side non-magnetic layer provided between the first magnetic pole and the second magnetic layer, and a second magnetic pole side non-magnetic layer provided between the first magnetic layer and the second magnetic pole.

Configuration 22

The evaluation device of the magnetic head according to Configuration 21, wherein the first magnetic pole side non-magnetic layer and the second magnetic pole side non-magnetic layer include a first material, the first non-magnetic layer includes a second material, the first material includes at least one selected from the group consisting of Ta, Pt, W, Ir, Mo, Cr, Tb, Mn, and Ni, and the second material includes at least one selected from the group consisting of Cu, Ag, Au, Cr, and Ru.

According to the embodiments, an evaluation method of a magnetic head and an evaluation device of a magnetic head can be provided, in which evaluation of characteristics of the magnetic head is possible.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the invention is not limited to these specific examples. For example, one skilled in the art may similarly practice the invention by appropriately selecting specific configurations of components included in evaluation devices of the magnetic heads such as circuits, addition averaging parts, amplifiers, and controllers, and included in magnetic heads such as magnetic poles, shields, magnetic elements, magnetic layers, nonmagnetic layers, and wires, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all evaluation methods of magnetic heads and evaluation devices of magnetic heads practicable by an appropriate design modification by one skilled in the art based on the evaluation methods of magnetic heads and the evaluation devices of magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An evaluation method of a magnetic head, the method comprising:
    acquiring an electrical signal obtained from a magnetic element when supplying a first alternating current to a coil of a magnetic head and supplying a second current to the magnetic element, the magnetic head including a first magnetic pole, a second magnetic pole, and a coil, the magnetic element being provided between the first magnetic pole and the second magnetic pole, and including a first magnetic layer; and
    detecting a time required for a change of an electrical resistance of the magnetic element based on a time when a polarity of the first alternating current is reversed based on the electrical signal,
    wherein
    the first alternating current has a first frequency, and
    the electrical signal has a second frequency that is twice the first frequency.

2. The method according to claim 1, wherein
the detecting the time required for the change includes
    addition averaging the electrical signal in synchronization with the first alternating current, and
    extracting a component of the second frequency of the added averaged electrical signal.

3. The method according to claim 1, wherein
the first frequency is not less than 1 MHz and not more than 5 GHz.

4. The method according to claim 1, wherein
the detecting the time required for the change includes
    adding and averaging electrical signal in synchronization with the first alternating current.

5. The method according to claim 1, wherein
the magnetic element further includes
    a first magnetic pole side non-magnetic layer provided between the first magnetic pole and the first magnetic layer, and
    a second magnetic pole side non-magnetic layer provided between the first magnetic layer and the second magnetic pole.

6. The method according to claim 5, wherein
in a case where the first magnetic pole side non-magnetic layer includes a first material and the second magnetic pole side non-magnetic layer includes a second material, the second current has a first orientation from the first magnetic pole to the second magnetic pole, the first material includes at least one selected from the group consisting of Ta, Pt, W, Ir, Mo, Cr, Tb, Mn, and Ni, the second material includes at least one selected from the group consisting of Cu, Ag, Au, Cr, and Ru, and
in a case where the first magnetic pole side non-magnetic layer includes the second material and the second magnetic pole side non-magnetic layer includes the first material, the second current has a second orientation from the second magnetic pole to the first magnetic pole.

7. The method according to claim 1, wherein
the magnetic element further includes
    a second magnetic layer provided between the first magnetic layer and the first magnetic pole, and
    a first non-magnetic layer provided between the first magnetic layer and the second magnetic layer.

8. The method according to claim 7, wherein
the magnetic element further includes
    a first magnetic pole side non-magnetic layer provided between the first magnetic pole and the second magnetic layer, and
    a second magnetic pole side non-magnetic layer provided between the first magnetic layer and the second magnetic pole.

9. The method according to claim 8, wherein
the first magnetic pole side non-magnetic layer and the second magnetic pole side non-magnetic layer include a first material,
the first non-magnetic layer includes a second material,
the first material includes at least one selected from the group consisting of Ta, Pt, W, Ir, Mo, Cr, Tb, Mn, and Ni, and
the second material includes at least one selected from the group consisting of Cu, Ag, Au, Cr, and Ru.

10. An evaluation device of a magnetic head, the evaluation device comprising:
a first circuit configured to supply a first alternating current to a coil of the magnetic head; the magnetic head including a first magnetic pole; a second magnetic pole; a magnetic element; and the coil, the magnetic element being provided between the first magnetic pole and the second magnetic pole, and including a first magnetic layer;
a second circuit configured to supply a second current to the magnetic element when the first alternating current is supplied to the coil: and
a third circuit configured to acquire an electrical signal obtained from the magnetic element when the first alternating current is supplied to the coil and the second current is supplied to the magnetic element, and configured to detect a time required tier a change of an electrical resistance of the magnetic element based on a time when a polarity of the first alternating current is reversed based on the electrical signal.

11. The device of the magnetic head according to claim 10, wherein
the first alternating current has a first frequency, and
the electrical signal has a second frequency that is twice the first frequency.

12. The device of the magnetic head according to claim 11, wherein
the third circuit includes an addition averaging part, and
the addition averaging part is configured to add and average the electrical signal in synchronization with the first alternating current and to extract a component of the second frequency of the added and averaged electrical signal.

13. The device of the magnetic head according to claim 11, wherein
the first frequency is not less than 1 MHz and not more than 5 GHz.

14. The device of the magnetic head according to claim 10, wherein
the third circuit includes an addition averaging part, and
the addition averaging part adds and averages the electrical signal in synchronization with the first alternating current.

15. The device of the magnetic head according to claim 14, wherein
the third circuit includes a DC-FAC superimposition circuit,
the DC±AC superimposition circuit includes
a DC+AC port electrically connected to the magnetic element,
a DC port electrically connected to the second circuit, and
an AC port configured to output a high frequency component of the electrical signal to the addition averaging part.

16. The device of the magnetic head according to claim 15, wherein
the third circuit includes an amplifier
the amplifier is configured to acquire the high frequency component from the AC port, and is configured to output an amplified signal of the high frequency component to the addition averaging part.

17. The device of the magnetic head according to claim 10, wherein
the magnetic element further includes
a first magnetic pole side non-magnetic layer provided between the first magnetic pole and the first magnetic layer, and
a second magnetic pole side non-magnetic layer provided between the first magnetic layer and the second magnetic pole.

18. The device of the magnetic head according to claim 17, wherein
in a case where the first magnetic pole side non-magnetic layer includes a first material and the second magnetic pole side non-magnetic layer includes a second material, the second current has a first orientation from the first magnetic pole to the second magnetic pole, the first material includes at least one selected from the group consisting of Ta, Pt, W, Ir, Mo, Cr, Tb, Mn, and Ni, the second material includes at least one selected from the group consisting of Cu, Ag, Au, Cr, and Ru, and
in a case where the first magnetic pole side non-magnetic layer includes the second material and the second magnetic pole side non-magnetic layer includes the first material, the second current has a second orientation from the second magnetic pole to the first magnetic pole.

19. The device of the magnetic head according to claim 10, wherein
the magnetic element includes
a second magnetic layer provided between the first magnetic layer and the first magnetic pole, and
a first non-magnetic layer provided between the first magnetic layer and the second magnetic layer.

20. An evaluation method of a magnetic head, the method comprising:
acquiring an electrical signal obtained from a magnetic element when supplying a first alternating current to a coil of a magnetic head and supplying a second current to the magnetic element, the magnetic head including a first magnetic pole, a second magnetic pole, and a coil, the magnetic element being provided between the first magnetic pole and the second magnetic pole, and including a first magnetic layer; and
detecting a time required for a change of an electrical resistance of the magnetic element based on a time when a polarity of the first alternating current is reversed based on the electrical signal,
wherein
the detecting the time required for the change includes adding and averaging the electrical signal in synchronization with the first alternating current.

* * * * *